US008047322B2

(12) United States Patent
Cimatti

(10) Patent No.: US 8,047,322 B2
(45) Date of Patent: Nov. 1, 2011

(54) OPTIONALLY CONNECTABLE FOUR-WHEEL DRIVE VEHICLE

(75) Inventor: Franco Cimatti, Pavullo (IT)

(73) Assignee: Ferrari S.p.A. (IT)

( * ) Notice: Subject to any disclaimer, the term of this patent is extended or adjusted under 35 U.S.C. 154(b) by 84 days.

(21) Appl. No.: 12/715,940

(22) Filed: Mar. 2, 2010

(65) Prior Publication Data

US 2010/0224431 A1 Sep. 9, 2010

(30) Foreign Application Priority Data

Mar. 3, 2009 (IT) .............................. BO2009A0123

(51) Int. Cl.
*B60K 17/354* (2006.01)

(52) U.S. Cl. ....................................... 180/245; 180/247

(58) Field of Classification Search .................. 180/245, 180/246, 247, 248, 249, 250, 233
See application file for complete search history.

(56) References Cited

U.S. PATENT DOCUMENTS 1,853,058 A * 4/1932 Johnson ........................ 180/242
2,953,942 A 9/1960 Schwarrtz et al.
7,661,495 B2 * 2/2010 Zohrer et al. .............. 180/65.22
2005/0255948 A1 11/2005 Chonan
2006/0169516 A1 * 8/2006 Masuya et al. ................ 180/246
2010/0206654 A1 * 8/2010 Cimatti et al. ................ 180/246

FOREIGN PATENT DOCUMENTS

DE 8910016 U1 10/1989
EP 0483764 A1 5/1992
GB 2230498 A 10/1990
GB 2235261 A 2/1991
WO WO-2008/120097 A1 10/2008

* cited by examiner

*Primary Examiner* — Anne Marie Boehler
*Assistant Examiner* — Tashiana Adams
(74) *Attorney, Agent, or Firm* — Schwegman, Lundberg & Woessner, P.A.

(57) ABSTRACT

An optionally connectable four-wheel drive vehicle provided with an engine having a drive shaft, two main drive wheels, a main power train permanently connecting the drive shaft to the main drive wheels, and in turn comprising a transmission and a main differential, two normally driven secondary drive wheels, and an optionally connectable secondary power train for also connecting the drive shaft to the secondary drive wheels, and in turn presenting a gear drive, at least one secondary clutch, which is connected on one side to the drive shaft upstream from the transmission, and on the other side to the secondary drive wheels, and a unit for the reversal of the motion, which is controlled to reverse or not to reverse the direction of the motion.

16 Claims, 11 Drawing Sheets

OPTIONALLY CONNECTABLE FOUR-WHEEL DRIVE VEHICLE

RELATED APPLICATION

This application claims the benefit of priority, under 35 U.S.C. Section 119, to Italian Patent Application Serial No. B02009A 000123 filed on Mar. 3, 2009 which is incorporated herein by reference in its entirety.

TECHNICAL FIELD

The present invention relates to an optionally connectable four-wheel drive vehicle.

The present invention may be used to advantage in a high-performance sports car, to which the following description refers purely by way of example.

BACKGROUND ART

A high-performance sports car normally has a rear-wheel drive, and a self-locking differential to maximize torque transmission by the rear wheels to the road surface in any driving condition.

A rear-wheel drive with a self-locking differential has advantages when driving in racing mode in good (dry-road) or fairly good (wet-road) grip conditions, but, in conjunction with high torque and wide tyres, makes for extremely difficult, potentially hazardous driving in poor grip conditions (flooded or icy roads). To improve handling of sports cars in poor grip conditions, a permanent or optionally connectable four-wheel drive has been proposed.

A permanent four-wheel drive greatly improves vehicle performance in poor grip conditions, but has the drawback of permanently increasing torque loss of the drive system and so resulting in good-grip vehicle performance which is not always popular with drivers.

An optionally connectable four-wheel drive, on the other hand, enables the driver to switch between a rear-wheel drive in good grip conditions, and a four-wheel drive in poor grip conditions.

Patent Application WO2005080117A2 describes an optionally connectable four-wheel drive vehicle comprising an engine with a drive shaft; two main drive wheels connected permanently to the drive shaft via a transmission with a first clutch; and two secondary drive wheels selectively connectable to the drive shaft by an optionally connectable drive system having a second clutch which is connected on one side with a fixed velocity ratio to the drive shaft upstream from the transmission, and is connected on the other side with a fixed velocity ratio to the secondary drive wheels.

Patent Application WO2006100585A1 describes a refinement of the optionally connectable four-wheel drive vehicle in Patent Application WO2005080117A2. More specifically, the percentage value of the torque to be transmitted to the secondary drive wheels by the second clutch is determined instant by instant as a function of dynamic vehicle parameters detected by respective sensors.

In the solutions proposed in Patent Applications WO2005080117A2 and WO2006100585A1, the four-wheel drive can only be engaged in low gears (typically, first, second, and third), and not at all in the other gears. Patent Application WO2008120097A1 describes a refinement of the optionally connectable four-wheel drive vehicle in Patent Applications WO2005080117A2 and WO2006100585A1, in which the optionally connectable secondary power train for connecting the drive shaft to the secondary drive wheels comprises a gear drive with at least two different, alternatively selectable velocity ratios. In this way, the optionally connectable secondary power train in Patent Application WO2008120097A1 is engageable (i.e. permits torque transfer to the front wheels) in substantially all the gears of the transmission.

Though, none of the connectable four-wheel drives described in the above mentioned patent applications is engageable (i.e. permits torque transfer to the front wheels) when the reverse gear is selected; this limitation can cause problems for the driver, since the reverse gear can be used to steer the car in bad drive conditions (e.g. to drive in reverse along a wet or icy ramp).

U.S. Pat. No. 1,853,058A1 describes a four-wheel drive vehicle comprising: an engine presenting a drive shaft; a pair of rear driving wheels; a rear power train connecting the drive shaft to the rear driving wheels and comprising a rear electromagnetic clutch, an electric motor, a rear transmission and a rear differential; a pair of front driving wheels; and a front power train connecting the drive shaft to the front driving wheels and comprising a front electromagnetic clutch, a front transmission, and a front differential. The front transmission and the rear transmission are controlled in a common and synchronized way by means of a mechanical interconnection and comprise a plurality of forward gears; though, the front and rear transmissions are not provided with a reverse gear.

Overview

Embodiments disclosed herein provide an optionally connectable four-wheel drive vehicle that is inexpensive and easy to produce, eliminates the aforementioned drawbacks, and at the same time provides for improving performance, stability, and drive in all grip conditions.

According to the embodiments of the present disclosure, there is provided an optionally connectable four-wheel drive vehicle, as claimed in the attached claims.

BRIEF DESCRIPTION OF THE DRAWINGS

A number of non-limiting embodiments of the present invention will be described by way of example with reference to the accompanying drawings, in which.

DETAILED DESCRIPTION

Figure 1:
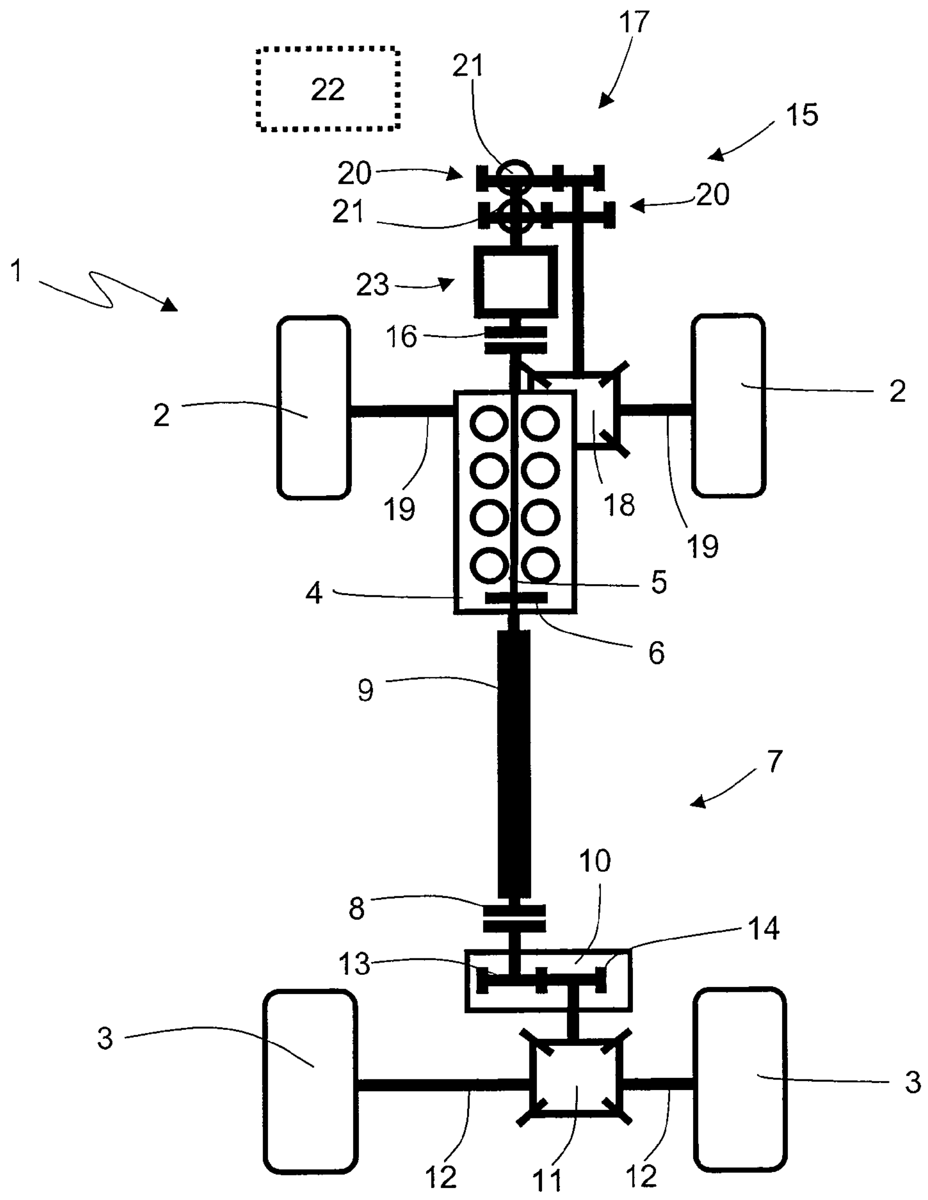
FIG. 1 shows a schematic plan view of an optionally connectable four-wheel drive car in accordance with some examples.

Number 1 in FIG. 1 indicates a car having two normally driven front wheels (or secondary drive wheels) 2; and two rear, permanent drive wheels (or main drive wheels) 3. Car 1 comprises a front longitudinal internal combustion engine 4, which has a drive shaft 5 fitted with a flywheel 6, and is connected to rear drive wheels 3 by a main power train 7. Main power train 7 comprises a main clutch 8 located at the rear and connected on one side to drive shaft 5 by a propeller shaft 9, and on the other side to a rear transmission 10. A rear (or main) differential 11 is cascade-connected to transmission 10, and from which extend two rear axle shafts 12, each integral with a rear wheel 3. A primary shaft 13 of transmission 10 is integral with the output of main clutch 8, and a secondary shaft 14 of transmission 10 is connected to rear differential 11.

Car 1 comprises an optionally connectable secondary power train 15 for also connecting front wheels 2 to drive shaft 5 and so also obtaining front drive wheels 2. Secondary power train 15 comprises a secondary clutch 16 connected on one side to drive shaft 5 upstream from transmission 10, and on the other side to front wheels 2 by a gear drive 17 and a front (or secondary) differential 18, from which extend two front axle shafts 19 integral with front wheels 2.

Gear drive 17 has two alternatively selectable velocity ratios. More specifically, gear drive 17 comprises two gear pairs 20, each with a respective velocity ratio, and each employable alternatively to the other gear pair 20.

In the FIG. 1 embodiment, each gear pair 20 comprises a shift device 21 (e.g., a synchronizer) for engaging/disengaging torque transmission by the respective gear pair 20. In this case, when secondary clutch 16 is released, a control unit 22 controls shift devices 21 to engage torque transmission by the desired gear pair 20, and disengage torque transmission by the other gear pair 20. Both gear pairs 20 may obviously be disengaged, but never engaged, at the same time.

Mechanical transmission 10 comprises a number of gears (i.e. a plurality of different velocity ratios), e.g. six forward gears (I to VI) and a reverse gear. Each velocity ratio of gear drive 17 is such that, when a respective synchronizing gear is engaged in transmission 10, the input and output of secondary clutch 16 are at the same speed. For example, the synchronizing gear of a first velocity ratio of gear drive 17 is the third (III), and the synchronizing gear of a second velocity ratio of gear drive 17 is the sixth (VI).

For secondary clutch 16 to transfer torque to front differential 18 (i.e. to front wheels 2), the output of secondary clutch 16 must be slower than or at the same speed as the input of secondary clutch 16. If secondary clutch 16 were to be engaged when its output is faster than its input, secondary clutch 16 would transfer torque from front differential 18 to transmission 10, i.e. to rear drive wheels 3, thus braking front wheels 2 and overtorquing rear drive wheels 3.

In control unit 22, each velocity ratio of gear drive 17 is associated with a group of gears of transmission 10, and is only used to transfer torque from drive shaft 5 to front wheels 2 if one of the gears in the respective group is engaged in transmission 10. In other words, each velocity ratio of gear drive 17 has a given synchronizing gear, and is therefore associated with a group of gears in transmission 10 comprising the respective synchronizing gear, and gears lower than the synchronizing gear. For example, if the synchronizing gear of a first velocity ratio of gear drive 17 is the third (III), and the synchronizing gear of a second velocity ratio of gear drive 17 is the sixth (VI), then the first velocity ratio of gear drive 17 is associated with a group of gears of transmission 10 comprising the first (I), second (II), and third (III), and the second velocity ratio of gear drive 17 is associated with a group of gears of transmission 10 comprising the fourth (IV), fifth (V), and sixth (VI).

Control of secondary clutch 16 is described in detail in Patent Application WO2006100585A1, which is commonly assigned and incorporated herein by reference in its entirety. A difference lies in control unit 22 being able to count of two different velocity ratios of gear drive 17 (such as being selectable alternatively prior to engaging secondary clutch 16) to transmit torque permanently or almost permanently to front wheels 2.

Figure 4:
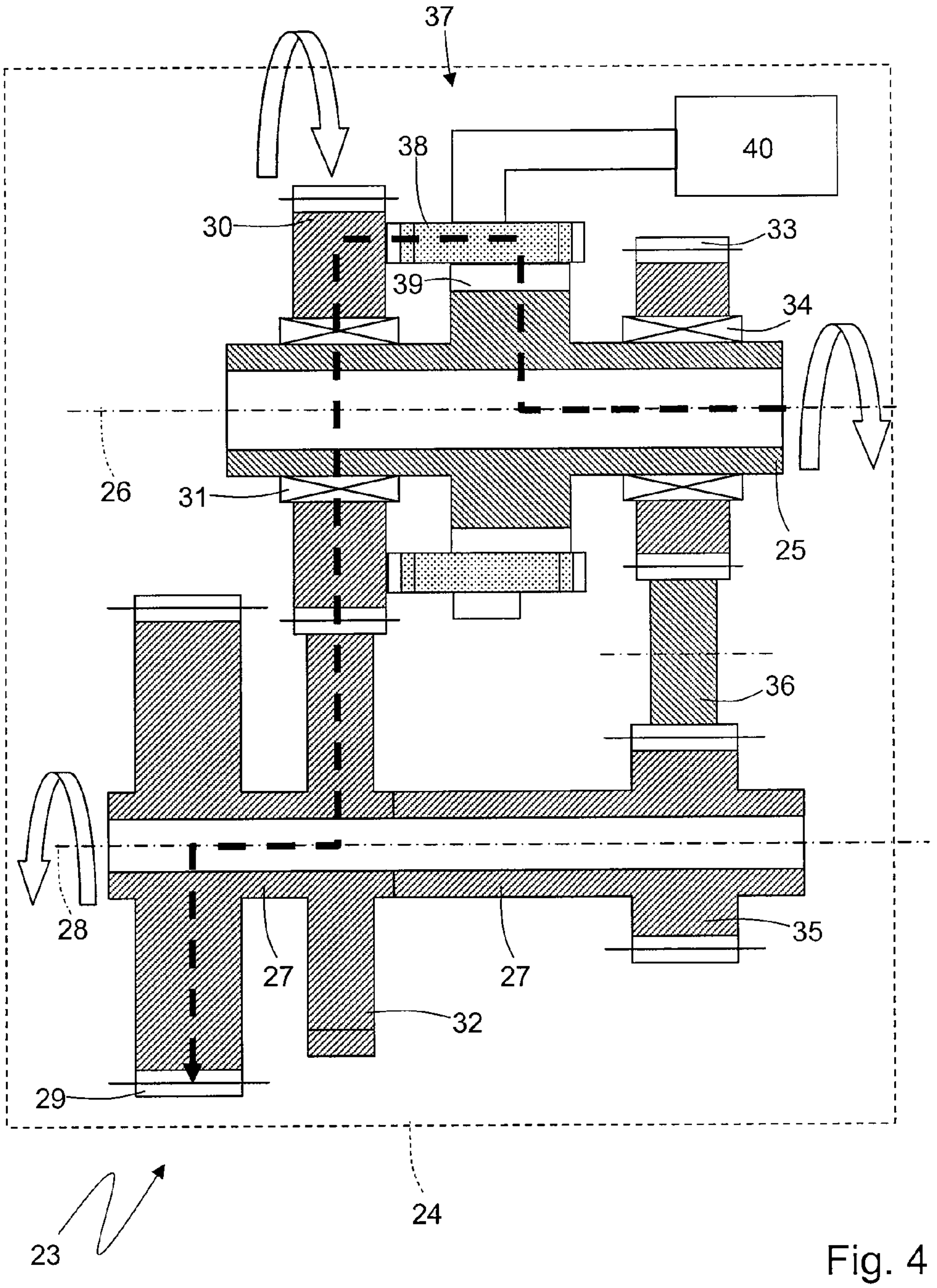
FIGS. 4 and 5 show respective schematic side views of the unit for the reversal of the motion shown in FIG. 3 in two different engagement positions.

In the FIG. 4 embodiment, gear drive 17 has one constant velocity ratio; and optionally connectable secondary power train 15 has no front differential 18, and comprises two secondary clutches 16, each connected directly to a respective front wheel 2. In other words, each secondary clutch 16 is coaxial with respective front wheel 2, and is connected at the output to an axle shaft 19 of respective front wheel 2. Optionally connectable secondary power train 15 comprises a bevel gear pair 28 for transmitting power from drive shaft 5 to secondary clutches 16, and, as stated, has no front differential 18, the function of which is performed by secondary clutches 16. In other words, any difference in the rotation speed of the two front wheels 2 is compensated by a corresponding difference in slip of the two secondary clutches 16.

As stated, mechanical transmission 10 comprises a number of gears, e.g. six forward gears (I to VI) and a reverse gear; i.e. a plurality of different velocity ratios. On the contrary, the gear drive 17 has a limited number of velocity ratios which is lower than the number of velocity ratios of the transmission 10; in the embodiment represented in FIG. 1, the gear drive 17 has two different velocity ratios, while in the embodiment represented in FIG. 2, the gear drive 17 has one single velocity ratio. Each velocity ratio of gear drive 17 is such that, when a respective synchronizing gear is engaged in transmission 10, the input and output of secondary clutch 16 are at the same speed.

The control unit 22 controls the secondary clutch 16 in such a way that:

the control unit 22 keeps the secondary clutch 16 completely open, irrespective of the request to engage the four-wheel drive, when the total velocity ratio of the main power train 7 is longer (i.e. higher) than the total velocity ratio of the secondary power train 15;

the control unit 22 completely closes the secondary clutch 16, in case the engagement of the four-wheel drive is requested, when the total velocity ratio of the main power train 7 is equal to the total velocity ratio of the secondary power train 15; and the control unit 22 partially closes the secondary clutch 16, in case the engagement of the four-wheel drive is requested, so that the secondary clutch 16 is made to operate with a certain slip in order to perform the speed adjustment aimed at compensating the difference in rotation speed between the drive shaft 5 and the two front wheels 2, when the total velocity ratio of the main power train 7 is shorter than the total velocity ratio of the secondary power train 15.

Figure 2:
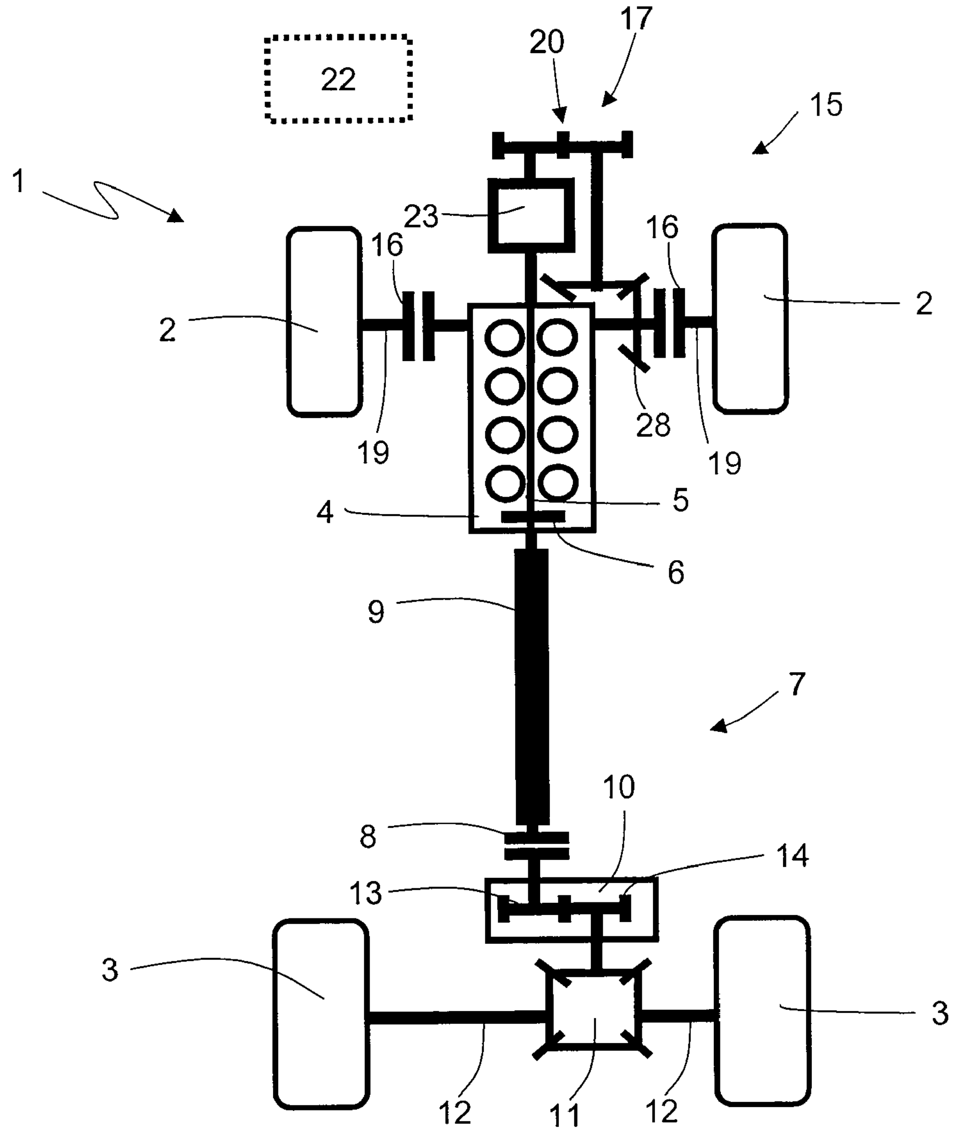
FIG. 2 shows a schematic plan view of a variation of the FIG. 1 car.

According to FIGS. 1 and 2, the secondary power train 15 also comprises a unit 23 for the reversal of the motion, which is controlled by a control unit 22 to reverse or not to reverse the direction of the motion; when the forward gear is selected in the transmission 10, the control unit 22 controls the unit 23 for the reversal of the motion not to carry out any reversal of the motion (thus, to make also the two front wheels rotate when the forward gear is engaged), while, when the reverse gear is selected in the transmission 10, the control unit 22 controls the unit 23 for the reversal of the motion to carry out the reversal of the motion (thus, to make also the two front wheels rotate when the reverse gear is engaged).

Figure 3:
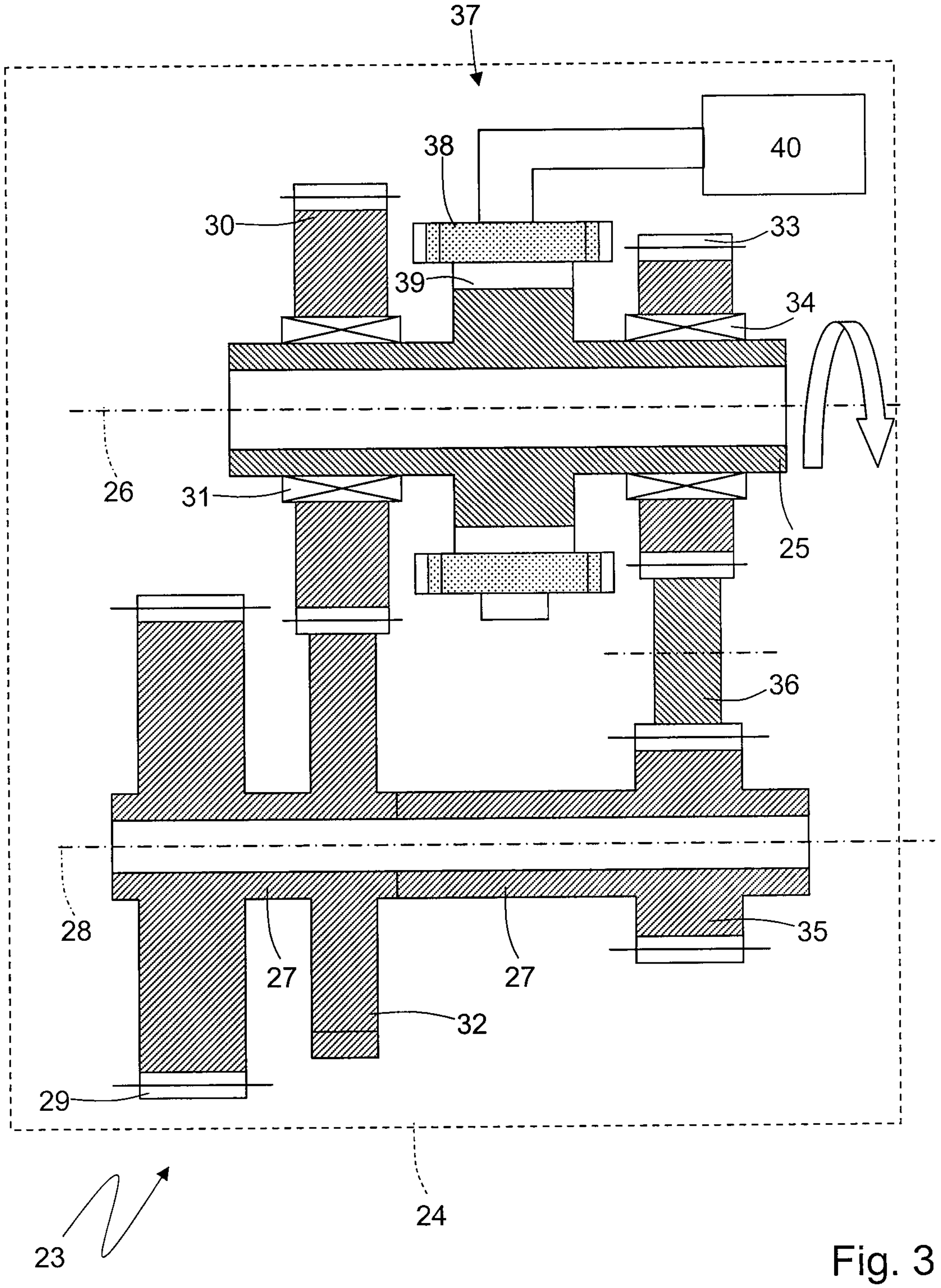
FIG. 3 shows a schematic side view of a unit for the reversal of the motion of a secondary power train of the cars shown in FIGS. 1 and 2.

According to FIG. 3, the unit 23 for the reversal of the motion is provided with a housing box 24, inside which all the components of the unit 23 for the reversal of the motion are arranged. The unit 23 for the reversal of the motion comprises an input shaft 25 which is mounted in order to rotate around a rotation axis 26, is mechanically constrained to the drive shaft 5 and protrudes from a side of the housing box 24. Moreover, the unit 23 for the reversal of the motion comprises an output shaft 27 which is mounted in order to rotate around a rotation axis 28, which is parallel to the rotation axis 26, is mechanically constrained to an input of the gear drive 17 and protrudes from a side of the housing box 24, which is opposite to the side from which the input shaft 25 protrudes. In particular, the output shaft 27 is provided with an output gear 29 which meshes with an input gear of the gear drive 17 in order to transmit the motion to the gear drive 17 itself.

The shafts 25 and 27 are mechanically coupled to each other through a pair of gears of the forward gears and through a pair of gears of the reverse gear. The pair of gears of the forward gear comprises an input gear 30 of the forward gear, which is mounted idle on the input shaft through the interposition of a bearing 31, and an output gear 32 of the forward gear, which is connected to the output shaft 27 in order to always rotate in an integral manner with the output shaft 27 itself and meshes directly with the input gear 30 of the forward gear. The pair of gears of the reverse gear comprises an input gear 33 of the reverse gear, which is mounted idle on the input shaft 25 through the interposition of a bearing 34, and an output gear 35 of the reverse gear, which is connected to the output shaft 27 in order to always rotate in an integral manner with the output shaft 27 and meshes indirectly with the input gear 33 of the forward gear through the interposition of a driven gear 36 which determines a reversal of the motion.

The unit 23 for the reversal of the motion comprises an engagement device 37 (that can be synchronized or non-synchronized) which is mounted coaxially to the input shaft 25, is arranged between the two input gears 30 and 33 and is aimed at being actuated in order to alternatively engage the two input gears 30 and 33 of the input shaft 25 (i.e. to make the two input gears 30 and 33 alternatively angularly integral to the input shaft 25). In particular, the engagement device 37 comprises a guide sleeve 38 which meshes with a coupling gear 38 integral to the input shaft 25 and is mounted axially mobile under the thrust of an electric or hydraulic actuator 40.

Figure 5:
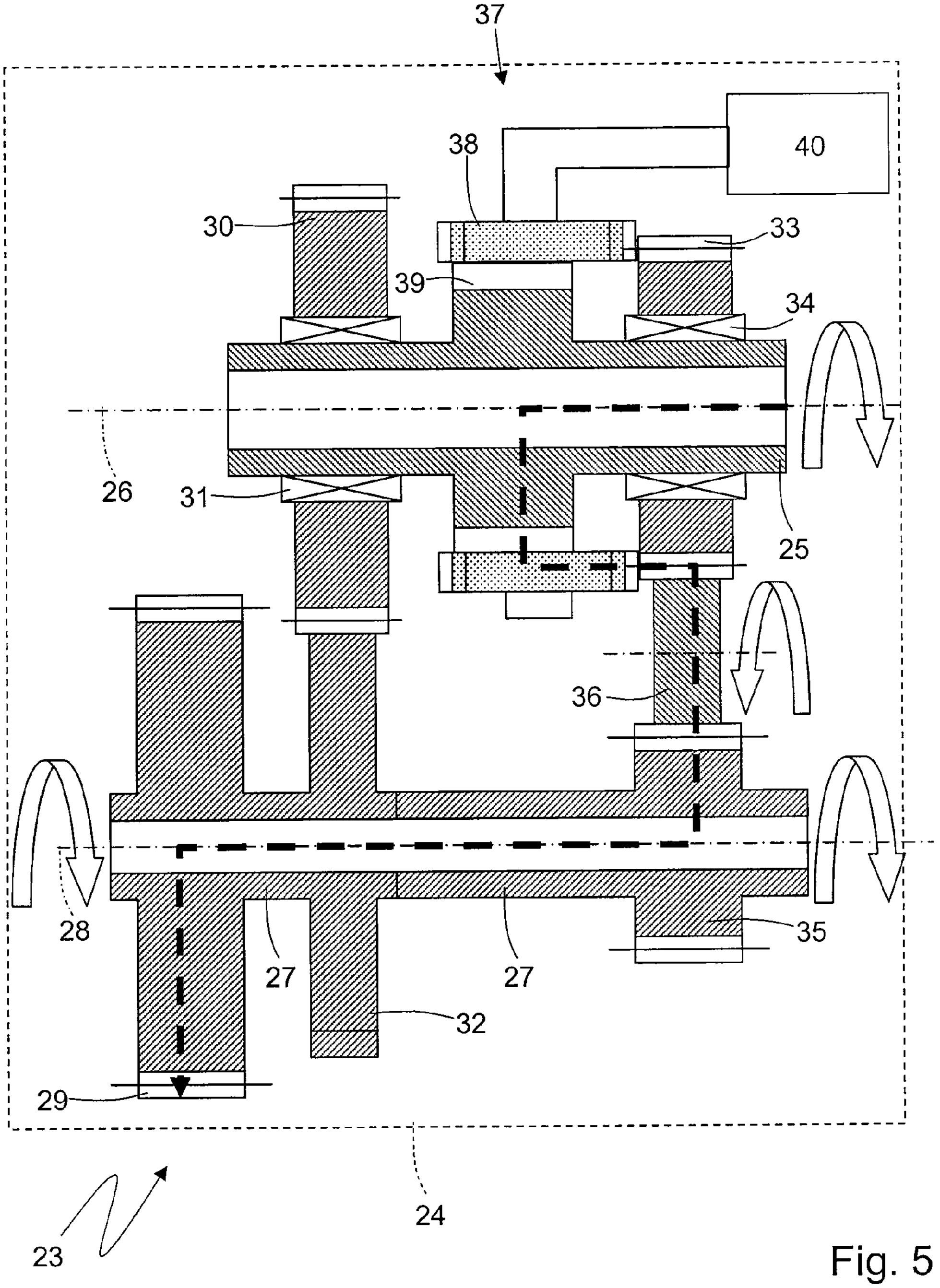

Under the thrust of the actuator 40 the guide sleeve 38 of the engagement device 37 is axially mobile among a central idle position (shown in FIG. 3), in which the guide sleeve 38 is separated from the two input gears 30 and 33 and therefore the motion is not transmitted from the input shaft 25 to the output shaft 27, a position of engagement of the forward gear (shown in FIG. 4), in which the guide sleeve 38 is coupled frontally to the input gear 30 of the forward gear, so that the motion is transmitted from the input shaft 25 to the output shaft 27 through the pair of gears of the forward gear, and a position of engagement of the reverse gear (shown in FIG. 5), in which the guide sleeve 38 is coupled frontally to the input gear 33 of the reverse gear, so that the motion is transmitted from the input shaft 25 to the output shaft 27 through the pair of gears of the reverse gear.

It is important to underline the importance of the central idle position from which it is necessary to pass when going from an engagement position to the other; in this way, one is sure that a situation in which the motion is transmitted simultaneously by both the pair of gears of the forward gear and the pair of gears of the reverse gear, with potentially destructive consequences, will never occur.

Figure 6:
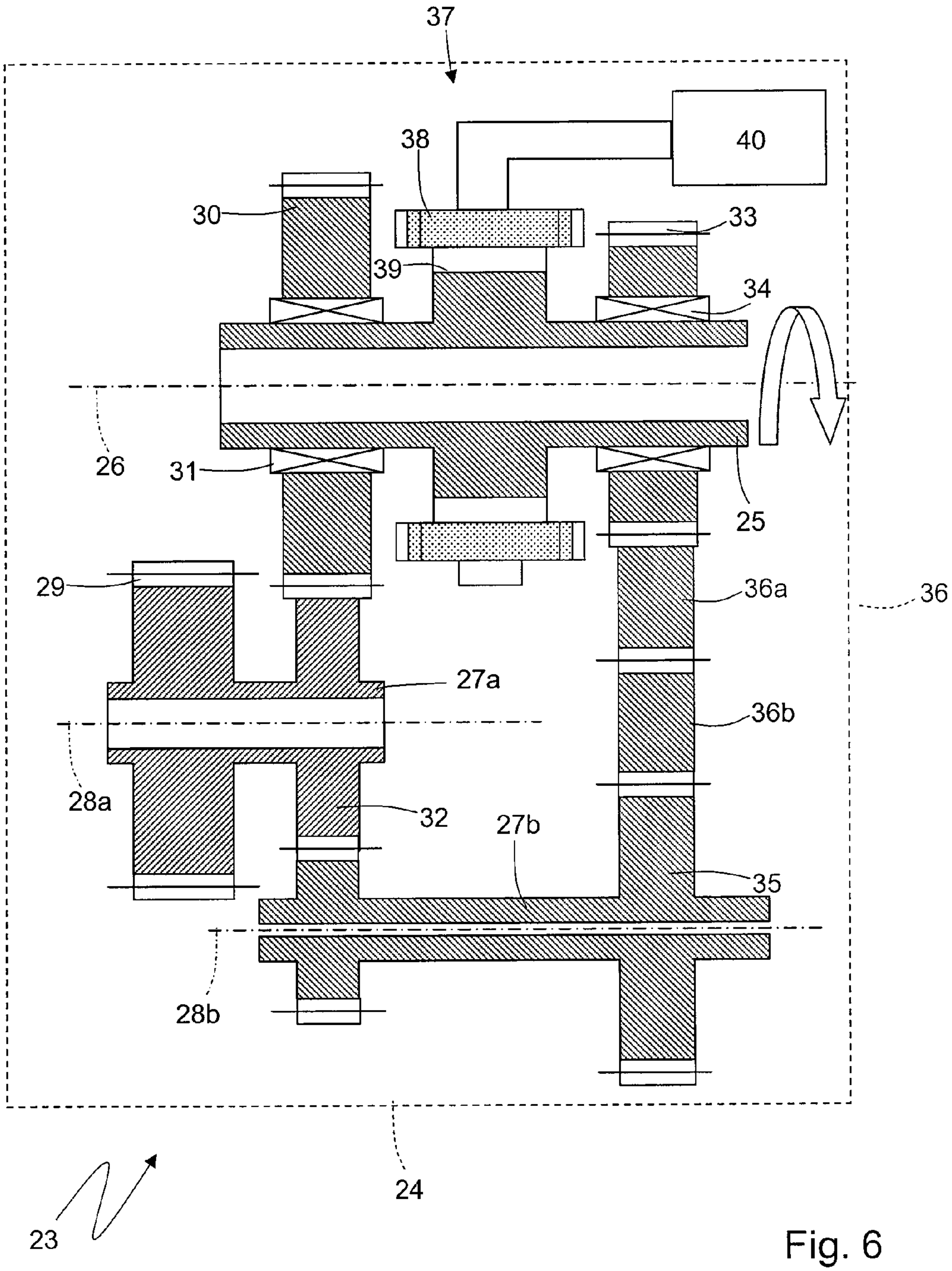
FIG. 6 shows a schematic side view of a variation of the unit for the reversal of the motion shown in FIG. 3.

The variation shown in FIG. 6, instead of being provided with one single output shaft 27, is provided with two output shafts 27*a* and 27*b* which are mounted in order to rotate around two respective rotation axis 28*a* and 28*b*, which are parallel to each other, and are angularly integral to each other through a gear coupling. The output shaft 27*a* supports both the output gear 29 and the output gear 32 of the forward gear, while the output shaft 27*b* supports the output gear 35 of the reverse gear. Moreover, to allow the reversal of the motion when the pair of gears of the reverse gear is engaged, there are two driven gears 36*a* and 36*b* in a cascade connection to connect the input gear 33 of the reverse gear to the output gear 35 of the reverse gear.

According to the shown embodiments, the unit 23 for the reversal of the motion is located upstream of the gear drive 17 (i.e. on the side of the internal combustion engine 4); according to an equivalent embodiment, which is not shown, the unit 23 for the reversal of the motion is located downstream of the gear drive 17 (i.e. on the side of the front wheels 2).

Figure 7:
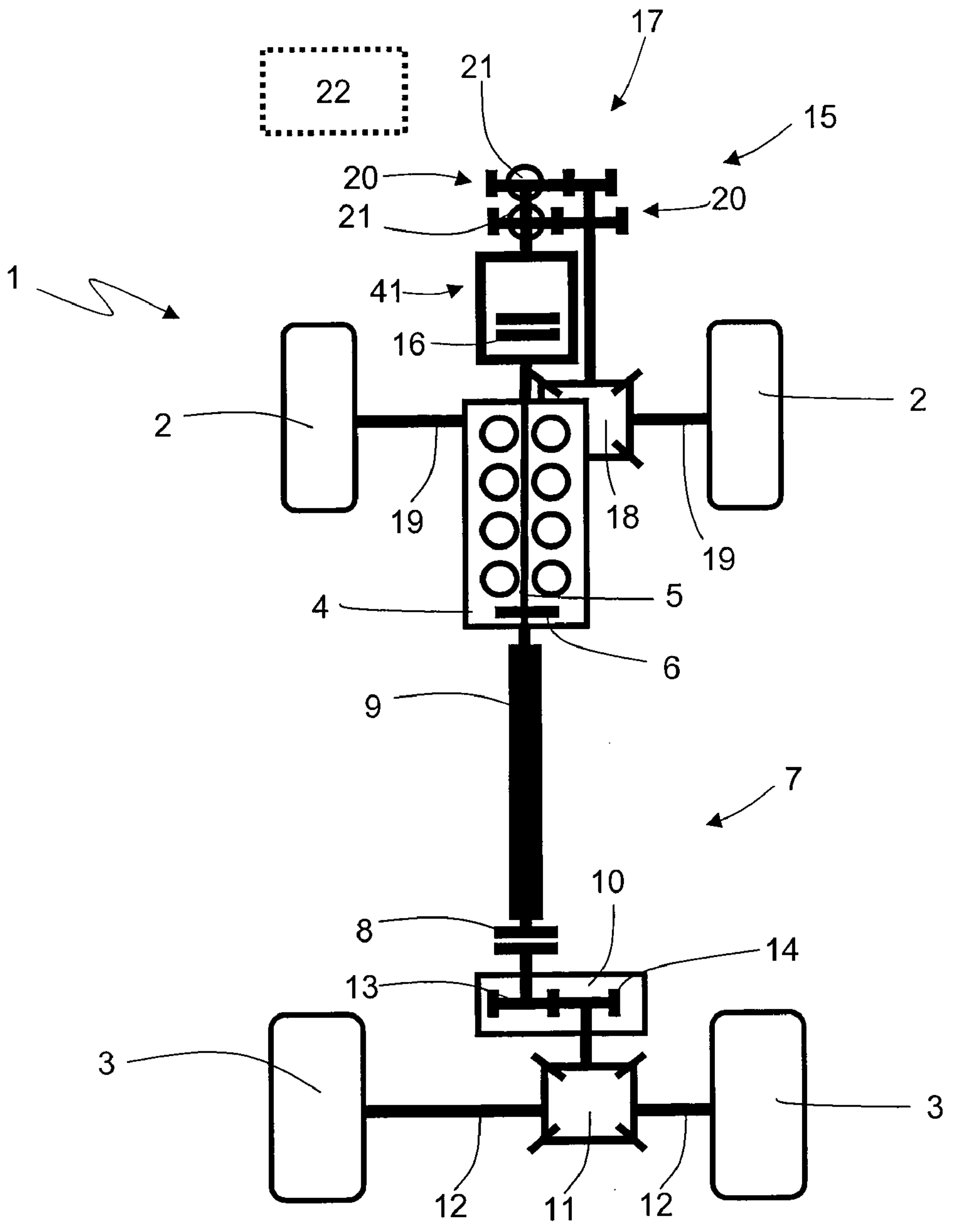
FIG. 7 shows a schematic plan view of a further variation of the FIG. 1 car.

The car 1 shown in FIG. 7 differs from the car shown in FIG. 1 due to the different configuration of the unit 41 for the reversal of the motion which includes in its inside the secondary clutch 16.

Figure 8:
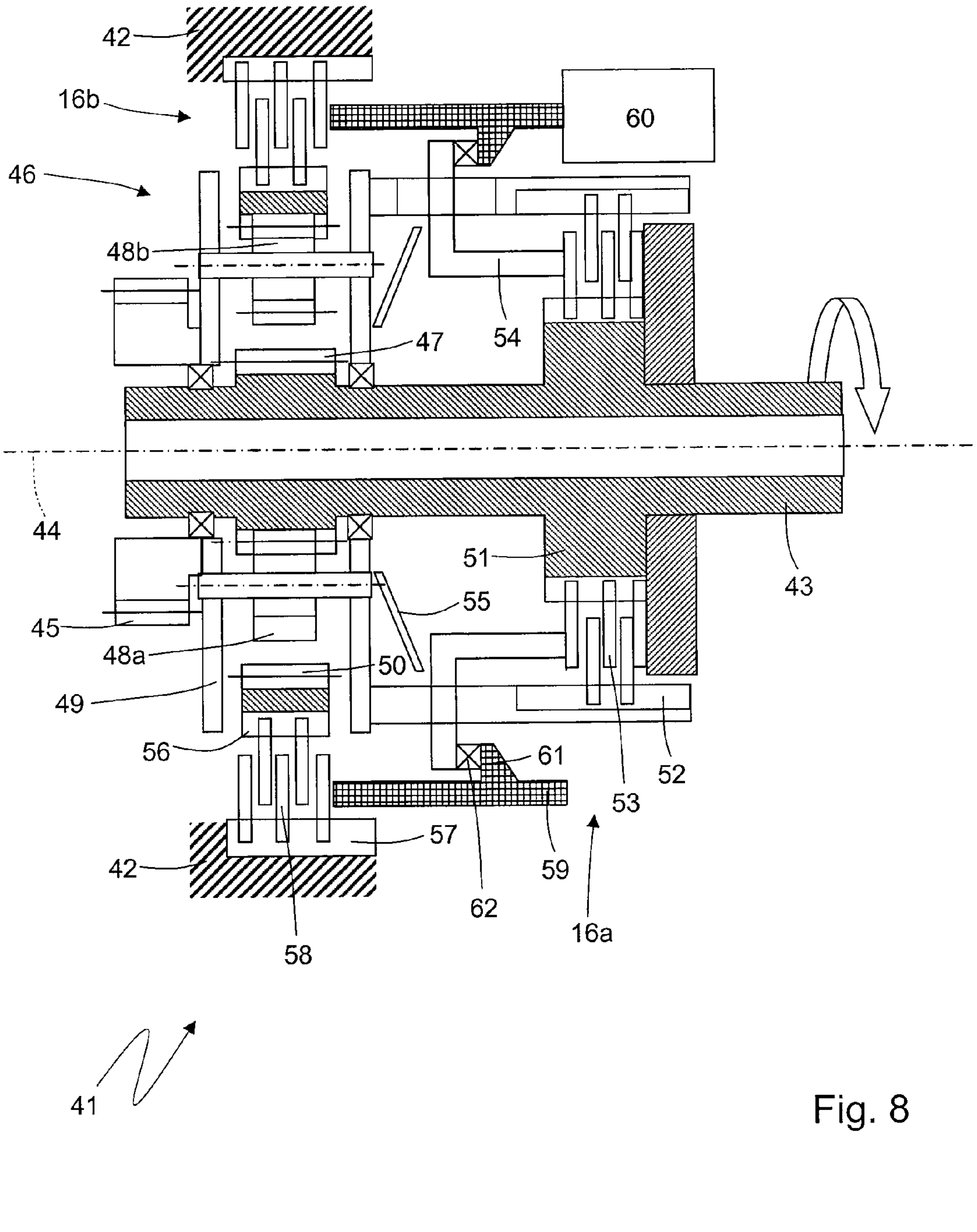
FIG. 8 shows a schematic side view of a unit for the reversal of the motion of a secondary power train of the car shown in FIG. 7.
Figure 9:
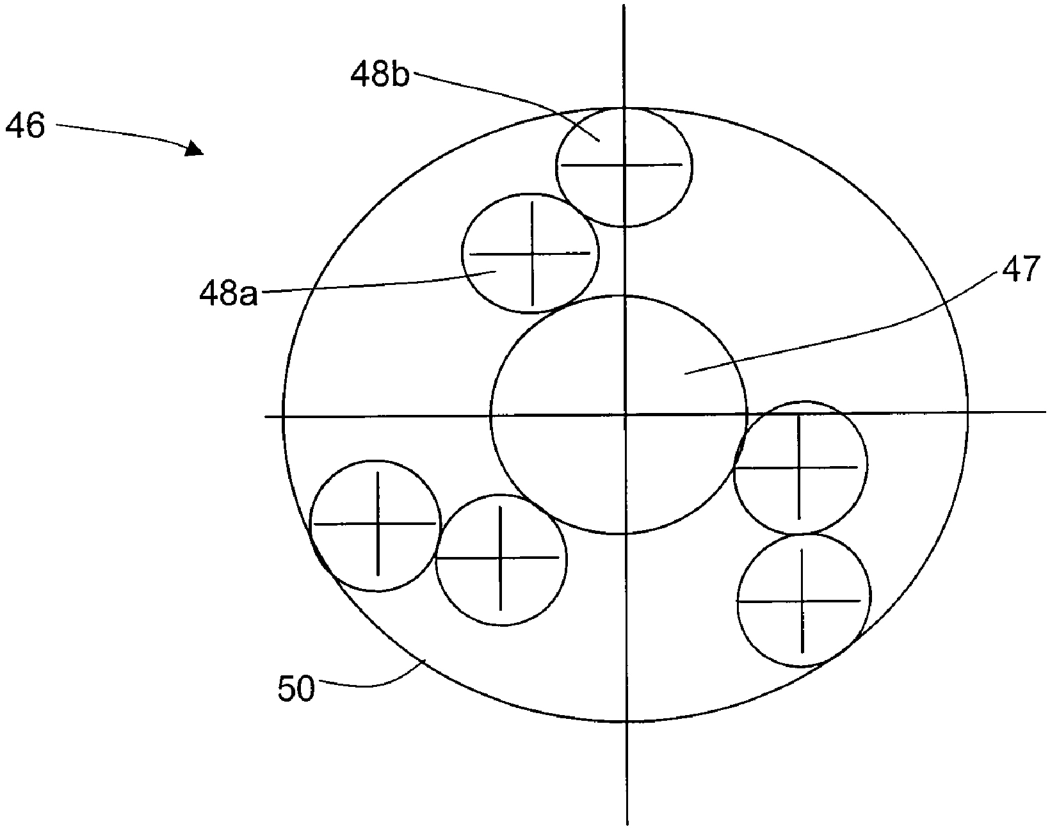
FIG. 9 shows a schematic front view of a worm gear of the unit for the reversal of the motion shown in FIG. 8.

According to FIG. 8, the unit 41 for the reversal of the motion of the car 1 shown in FIG. 7 is provided with a housing box 42, inside which all the components of the unit 41 for the reversal of the motion are arranged. The unit 41 for the reversal of the motion comprises an input shaft 43 which is mounted in order to rotate around a rotation axis 44, is mechanically constrained to the drive shaft 5 and protrudes from a side of the housing box 42. Moreover, the unit 41 for the reversal of the motion comprises an output shaft 45 (in particular an output gear, but according to a not shown embodiment it could also be an output shaft) which is mounted in order to rotate around a rotation axis 44 (thus, coaxially to the input shaft 43), is mechanically constrained to an input of the gear drive 17 and protrudes from a side of the housing box 42, which is opposite to the side from which the input shaft 43 protrudes. In particular, the output element 45 is a gear which meshes with an input gear of the gear drive 17 in order to transmit the motion to the gear drive 17 itself.

The unit 41 for the reversal of the motion comprises a worm gear 46 which is mounted coaxially to the rotation axis 44 and presents a central sun gear 47 which is connected to the input shaft 43 (i.e. integral to the input shaft 43), three pairs of planetary gears supported by a revolving carrier 49 which is angularly integral to the output element 45, and an annular gear 50 with internal toothing which constitutes the ring. Each pair of planetary gears 48 comprises an internal sun gear 48*a* which, on one side, meshes with the central sun gear 47 and, on the other side, meshes with an external sun gear 48*b*; the external sun gear 48*b* meshes, on one side, with an internal sun gear 48*a* and, on the other side, with the annular gear 50.

The unit 41 for the reversal of the motion comprises a clutch 16*a* which is interposed between the input shaft 43 and the carrier 49 (thus, between the input shaft 43 and the output element 45, since the output element 45 is integral to the carrier 49), in order to render the input shaft 43 integral to the carrier 49 (thus, to the output shaft 45) when desired. The clutch 16*a* comprises a hub 51, which is integral to the input shaft 43, a bell 52, which is integral to the carrier 49, a pack 53 of disks which are alternatively supported by the hub 51 and by the bell 52, and a pressure plate 54, which is adapted to pushing the pack of disks in order to clamp the pack 53 of disks itself and, therefore, render the input shaft 43 integral to the carrier 49. There is also a Belleville washer which is compressed between the carrier 49 and the pressure plate 54, in order to exercise on the pressure plate 54 an elastic force which tends to keep the pack 53 of disks compressed (i.e. the clutch 16*a* closed and therefore the input shaft 43 integral to the output element 45).

The unit 41 for the reversal of the motion comprises a clutch 16*b* which is interposed between the annular gear 50 and the housing box 42, in order to render the annular gear 50 integral to the housing box 42 when desired. The clutch 16*b* comprises an annular hub 56, which is integral to the annular gear 50 (i.e. arranged externally around the annular gear 50), a bell 57, which is integral to the housing box 42, a pack 58 of disks which are alternatively supported by the hub 56 and by the bell 57, and a pressure plate 59, which is aimed at pushing the pack 58 of disks in order to clamp the pack 58 of disks itself and, therefore, render the annular gear 50 integral to the housing box 42.

The pressure plate 59 pushes a disk which is integral to the bell 57 and, therefore, never rotates; as a consequence the pressure plate 59 (which does not rotate) is directly mechanically connected to an electric or hydraulic actuator 60 which pushes axially the pressure plate 59. Moreover, there is also a mechanical connection 61 which constrains the pressure plate 59 to the pressure plate 54, so that the pressure plate 54 shifts integrally to the pressure plate 59 and vice versa; the mechanical connection 61 comprises a bearing 62 which is interposed between the pressure plate 54 and the pressure plate 59, since the pressure plate 59 acts on a disk which is integral to the bell 57 and therefore does not rotate, while the pressure plate 54 acts on a disk which is integral to the hub 51 and therefore can rotate.

Figure 10:
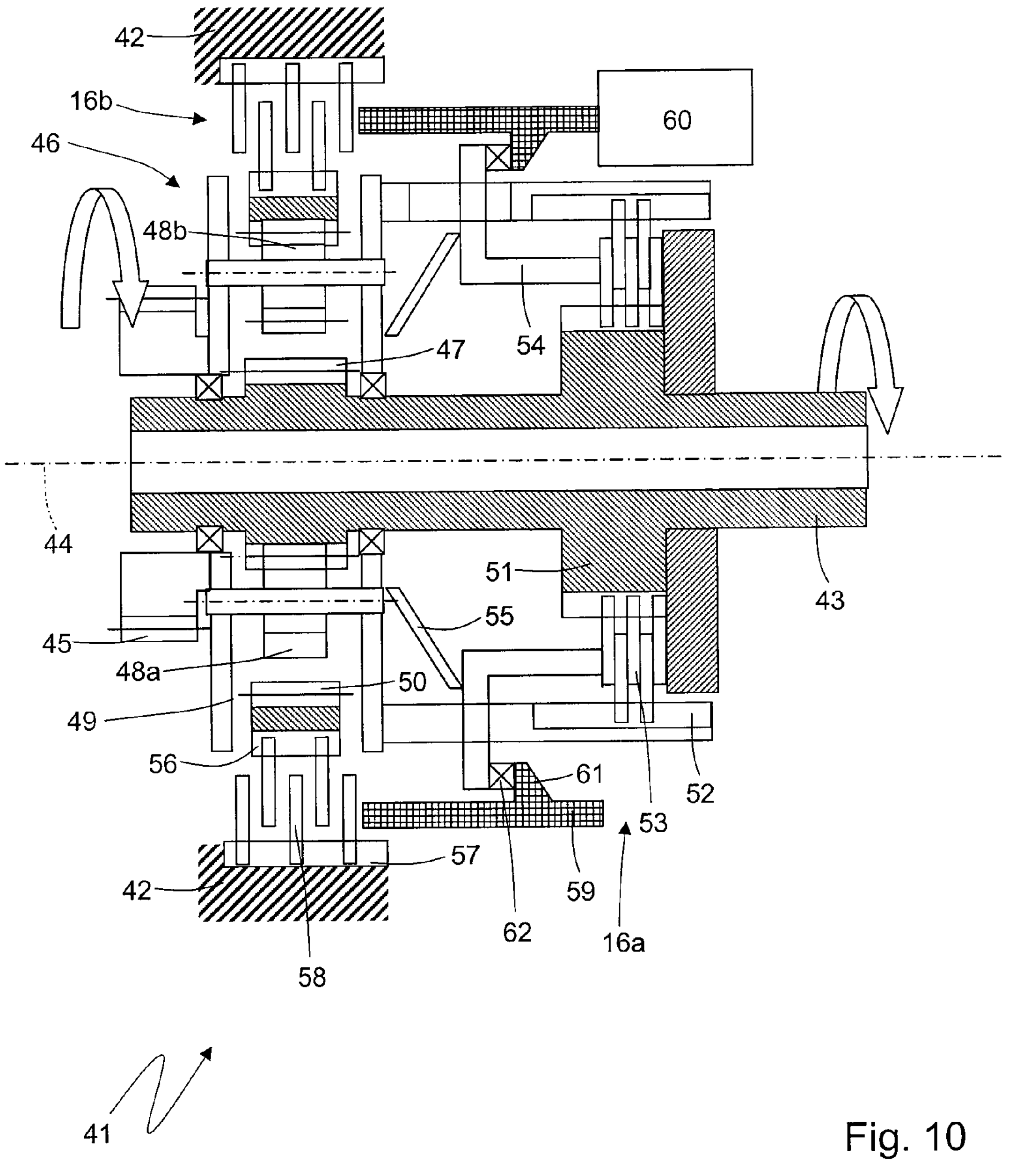
FIGS. 10 and 11 show respective schematic side views of the unit for the reversal of the motion shown in FIG. 8 in two different engagement positions.
Figure 11:
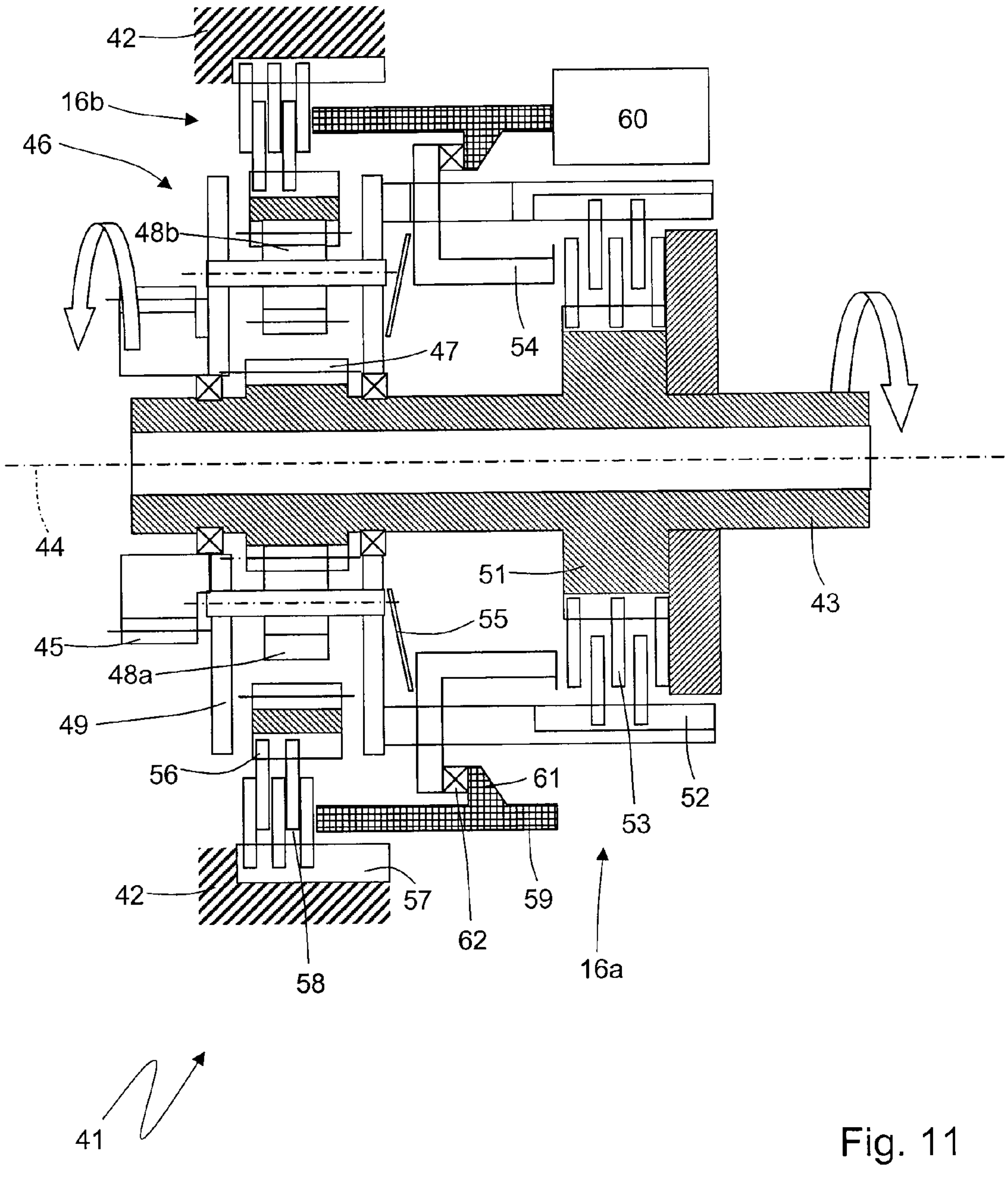

The previous description makes it evident that the actuation of the clutch 16*a* is strictly connected to the actuation of the clutch 16*b*, due to the mechanical connection 61 between the pressure plate 54 of the clutch 16*a* and the pressure plate 59 of the clutch 16*b*. As a consequence, when the actuator 60 is not active due to the elastic thrust of the Belleville washer 55 on the pressure plate 54 (and therefore also on the pressure plate 59 which is mechanically constrained to the pressure plate 54), the clutch 16*a* is closed, while the clutch 16*b* is open. Vice versa, when the actuator 60 is operated to shift the pressure plates 54 and 59 by compressing the washer 55, the clutch 16*a* is opened (while the clutch 16*b* remains open, as well) and then the clutch 16*b* is closed; in other words, there are three different positions: a central idle position (shown in FIG. 8) in which both clutches 16*a* and 16*b* are open and therefore the motion is not transmitted from the input shaft 43 to the output element 45, a position of engagement of the forward gear (shown in FIG. 10) in which the clutch 16*a* is closed and the clutch 16*b* is open, so that the motion is transmitted from the input shaft 43 to the output element 45, constraining, through the clutch 16*a*, the input shaft 43 to the carrier 49 and therefore to the output element 45, and a position of engagement of the reverse gear (shown in FIG. 11) in which the clutch 16*b* is closed and the clutch 16*a* is open, so that the motion is transmitted from the input shaft 43 to the output element 45 through the planetary gears 48 which determine a reversal of the motion.

It is crucial to underline the importance of the central idle position from which it is necessary to pass when going from an engagement position to the other; in this way, one is sure that a situation in which the motion is transmitted simultaneously along both paths, with potentially destructive consequences, will never occur.

In the embodiment shown in FIGS. 8-11, the unit 41 for the reversal of the motion comprises two different clutches 16*a* and 16*b* which fulfill the function of secondary clutch 16, in order to carry out, when necessary, the speed adjustment needed to compensate the different rotation speed between the drive shaft 5 and the front wheels 2; in particular the clutch 16*a* is used only for the forward gear, while the friction 16*b* is used only for the reverse gear.

According to a further embodiment, which is not shown, the unit 41 for the reversal of the motion shown in FIGS. 8-11 is coupled in series to a further external secondary clutch 16, as illustrated, by way of example, in FIG. 1; in this case the clutches 16*a* and 16*b* of the unit 41 for the reversal of the motion do not carry out, when necessary, the speed adjustment needed to compensate the different rotation speed between the drive shaft 5 and the front wheels 2.

The connectable four-wheel drives described above can easily and economically be produced, are compact and light and, above all, are engageable (i.e. permit torque transfer to the front wheels 2) when the reverse gear is selected in the transmission 10.

The invention claimed is:

1. An optionally connectable four-wheel drive vehicle comprising:

an engine having a drive shaft;

two main drive wheels;

a main power train permanently connecting the drive shaft to the main drive wheels, and in turn comprising a transmission presenting a plurality of different velocity ratios, and a main differential;

two normally driven secondary drive wheels; and an optionally connectable secondary power train for also connecting the drive shaft to the secondary drive wheels, and in turn comprising a gear drive presenting a limited number of velocity ratios which is lower than the number of velocity ratios of the transmission, and at least one secondary clutch, which is connected on one side to the drive shaft upstream from the transmission, and on the other side to the secondary drive wheels; and a control unit which: keeps the secondary clutch completely open, irrespective of the request to engage the four-wheel drive, when the total velocity ratio of the main power train is longer than the total velocity ratio of the secondary power train; closes completely the secondary clutch, in case the engagement of the four-wheel drive is requested, when the total velocity ratio of the main power train is equal to the total velocity ratio of the secondary power train; and closes partially the secondary clutch, in case the engagement of the four-wheel drive is requested, so that the secondary clutch is made to operate with a certain slip in order to perform the speed adjustment, when the total velocity ratio of the main power train is shorter than the total velocity ratio of the secondary power train;

wherein the optionally connectable secondary power train comprises a unit for the reversal of the motion, which is controlled to reverse or not to reverse the direction of the motion.

2. A vehicle as claimed in claim 1, wherein the control unit which controls the unit for the reversal of the motion is to not carry out any reversal of the motion, when a forward gear is selected in the transmission, and to carry out the reversal of the motion when the reverse gear is selected in the transmission.

3. A vehicle as claimed in claim 1, wherein the unit for the reversal of the motion includes in its inside the secondary clutch.

4. A vehicle as claimed in claim 1, wherein the unit for the reversal of the motion comprises:

an input shaft which is mounted in order to rotate around a first rotation axis;

at least one output shaft which is mounted in order to rotate around a second rotation axis, which is parallel to the rotation axis;

at least one pair of gears of the forward gear and one pair of gears of the reverse gear, which mechanically couple to each other the two shafts; and an engagement device which is actuated to engage alternatively the pair of gears of the forward gear or the pair of gears of the reverse gear.

5. A vehicle as claimed in claim 4, wherein the output shaft is provided with an output gear which meshes with an input gear of the gear drive in order to transmit the motion to the gear drive itself.

6. A vehicle as claimed in claim 4, wherein:

the pair of gears of the forward gear comprises an input gear of the forward gear, which is mounted idle on the input shaft through the interposition of a bearing, and an output gear of the forward gear, which is connected to the output shaft in order to always rotate in an integral manner with the output shaft itself and meshes directly with the input gear of the forward gear; and the pair of gears of the reverse gear comprises an input gear of the reverse gear, which is mounted idle on the input shaft through the interposition of a bearing, and an output gear of the reverse gear, which is connected to the output shaft in order to always rotate in an integral manner with the output shaft and meshes indirectly with the input gear of the reverse gear through the interposition of at least a driven gear which determines a reversal of the motion.

7. A vehicle as claimed in claim 6, wherein the engagement device comprises a guide sleeve, which meshes with a coupling gear integral to the input shaft and is mounted axially mobile under the thrust of an actuator (40) between the two input gears in order to mesh alternatively the two input gears to the input shaft.

8. A vehicle as claimed in claim 4, wherein the unit for the reversal of the motion comprises two output shafts which are mounted in order to rotate around two respective rotation axis, which are parallel to each other, and are angularly integral to each other through a gear coupling.

9. A vehicle as claimed in claim 1, wherein the unit comprises:

a housing box;

an input shaft which is mounted in order to rotate around a rotation axis;

an output element which is mounted in order to rotate around a rotation axis; and a worm gear which is mounted coaxially to the rotation axis and presents a central sun gear which is connected to the input shaft, a revolving carrier which is angularly integral to the output element, a number of pairs of planetary gears which are supported by the carrier, and an annular gear with internal toothing which constitutes the ring.

10. A vehicle as claimed in claim 9, wherein each pair of planetary gears comprises:

an internal sun gear which, on one side, meshes with the central sun gear and, on the other side, meshes with an external sun gear; and an external sun gear which, on one side, meshes with an internal sun gear and, on the other side, meshes with the annular gear.

11. A vehicle as claimed in claim 9, wherein the unit for the reversal of the motion comprises:

a first clutch which is interposed between the input shaft and the carrier, in order to render, when desired, the input shaft integral to the carrier under the thrust of a first pressure plate; and a second clutch which is interposed between the annular gear and the housing box, in order to render, when desired, the annular gear integral to the housing box under the thrust of a second pressure plate.

12. A vehicle as claimed in claim 11, wherein the first clutch comprises:

a first hub, which is integral to the input shaft;

a first bell, which is integral to the carrier;

a first pack of disks which are alternatively supported by the first hub (51) and by the first bell; and the first pressure plate, which is aimed at pushing the first pack of disks in order to clamp the first pack of disks itself and, therefore, render the input shaft integral to the carrier.

13. A vehicle as claimed in claim 11, wherein the second clutch comprises:

a second annular hub, which is integral to the annular gear;

a second bell, which is integral to the housing box;

a second pack of disks of disks which are alternatively supported by the second hub and by the second bell; and the second pressure plate, which is aimed at pushing the second pack of disks in order to clamp the second pack of disks itself and, therefore, render the annular gear integral to the housing box.

14. A vehicle as claimed in claim 11, wherein the unit for the reversal of the motion comprises:

a mechanical connection which constrains the first pressure plate to the second pressure plate, so that the first pressure plate shifts integrally to the second pressure plate and vice versa; and a common actuator which acts on the pressure plates.

15. A vehicle as claimed in claim 14, wherein the unit for the reversal of the motion comprises a washer which exercises on the pressure plate an elastic force which tends to keep the first clutch closed and the second clutch open.

16. A vehicle as claimed in claim 14, wherein the mechanical connection comprises a bearing which is interposed between the first pressure plate and the second pressure plate.

* * * * *